(12) United States Patent
Konno et al.

(10) Patent No.: US 11,008,352 B2
(45) Date of Patent: May 18, 2021

(54) METHOD FOR PRODUCING CYCLOMETALATED IRIDIUM COMPLEX

(71) Applicant: NATIONAL INSTITUTE OF ADVANCED INDUSTRIAL SCIENCE AND TECHNOLOGY, Tokyo (JP)

(72) Inventors: Hideo Konno, Tsukuba (JP); Junichi Taniuchi, Tsukuba (JP); Rumi Kobayashi, Tsukuba (JP); Yasushi Masahiro, Tokyo (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 62 days.

(21) Appl. No.: 16/344,315

(22) PCT Filed: Dec. 4, 2017

(86) PCT No.: PCT/JP2017/043455
§ 371 (c)(1),
(2) Date: Apr. 23, 2019

(87) PCT Pub. No.: WO2018/116796
PCT Pub. Date: Jun. 28, 2018

(65) Prior Publication Data
US 2020/0181181 A1    Jun. 11, 2020

(30) Foreign Application Priority Data
Dec. 21, 2016 (JP) .............................. JP2016-248449

(51) Int. Cl.
*C07F 15/00* (2006.01)
(52) U.S. Cl.
CPC ................................ *C07F 15/0033* (2013.01)
(58) Field of Classification Search
CPC .................................................. C07F 15/0033
USPC ...................................... 546/4, 10; 548/103
See application file for complete search history.

(56) References Cited

U.S. PATENT DOCUMENTS

| | | | |
|---|---|---|---|
| 10,538,543 B2 * | 1/2020 | Konno ................... | C07F 15/00 |
| 2004/0169463 A1 | 9/2004 | Burn et al. | |
| 2005/0116622 A1 | 6/2005 | Lo et al. | |
| 2006/0142604 A1 | 6/2006 | Bach et al. | |
| 2008/0211391 A1 | 9/2008 | Burn et al. | |
| 2010/0127251 A1 | 5/2010 | Burn et al. | |
| 2011/0272688 A1 | 11/2011 | Burn et al. | |
| 2017/0166599 A1 | 6/2017 | Abe et al. | |

FOREIGN PATENT DOCUMENTS

| | | |
|---|---|---|
| JP | 2003-231692 A | 8/2003 |
| JP | 2006-521324 A | 9/2006 |
| WO | WO-02/067343 A1 | 8/2002 |
| WO | WO-03/079736 A1 | 9/2003 |
| WO | WO-2004/085449 A1 | 10/2004 |
| WO | WO-2006/097717 A1 | 9/2006 |
| WO | WO-2016/006523 A1 | 1/2016 |

OTHER PUBLICATIONS

International Searching Authority, "International Search Report," issued in connection with International Patent Application No. PCT/JP2017/043455, dated Jan. 30, 2018.
International Searching Authority, "Written Opinion," issued in connection with International Patent Application No. PCT/JP2017/043455, dated Jan. 30, 2018.
Freedman et al., "Photochemical Generation of Reactive Transition-Metal Intermediates from Air-Stable Precursors. Carbon-Hydrogen Bond Activation via Near-Ultraviolet Photolysis of Cp*Ir(L)(oxalate) and Cp*Ir(L)(N$_3$)$_2$ Complexes," Inorganic Chemistry, vol. 30, No. 4, 1991, pp. 836-840.
European Search Report dated Sep. 26, 2019 for corresponding Application No. 17882984.2 (7 pages).
K. T. Kan et al: "A Study of the Pfeiffer Effect in Systems containing Trisoxalatometallate(III) Complexes and Cinchonine Hydrochloride", Canadian Journal of Chemistry, vol. 49, No. 12, Jun. 15, 1971 (Jun. 15, 1971), pp. 2161-2165, XP055622016, CA (5 pages).

* cited by examiner

*Primary Examiner* — Charanjit Aulakh
(74) *Attorney, Agent, or Firm* — Foley & Lardner LLP

(57) ABSTRACT

The present invention provides a method for producing a cyclometalated iridium complex, the method including producing a cyclometalated iridium complex by reacting a cyclometalated iridium complex raw material including an organoiridium compound with an aromatic heterocyclic bidentate ligand capable of forming an iridium-carbon bond and an iridium-nitrogen bond, and using as the raw material an organoiridium compound including a substructure represented by the following General Formula (1). The present invention is capable of producing a cyclometalated iridium complex with a high yield without by-production of a halogen-crosslinked iridium dimer.

[Chemical Formula 1]

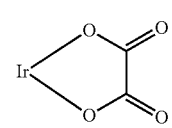

General Formula (1)

(in General Formula (1), Ir represents an iridium atom, and O represents an oxygen atom).

4 Claims, No Drawings

METHOD FOR PRODUCING CYCLOMETALATED IRIDIUM COMPLEX

RELATED APPLICATIONS

The present application claims priority under 37 U.S.C. § 371 to International Patent Application No. PCT/JP2017/043455, filed Dec. 4, 2017, which claims priority to and the benefit of Japanese Patent Application No. 2016-248449, filed on Dec. 21, 2016. The contents of these applications are hereby incorporated by reference in their entireties.

TECHNICAL FIELD

The present invention relates to a technique for producing a cyclometalated iridium complex with a high yield and a high purity. The cyclometalated iridium complex is used as a phosphorescent material for organic electroluminescent (EL) devices, organic electrochemiluminescent (ECL) devices, luminescent sensors, photosensitizing pigments, photocatalysts, luminescent probes, various light sources, and the like.

BACKGROUND ART

Organic EL devices obtained by use of a phosphorescent material have light-emitting efficiency 3 to 4 times higher than that of conventional organic EL devices obtained by use of a fluorescent material, and thus are being extensively researched and developed. As a phosphorescent material, an iridium complex is known in which an aromatic heterocyclic bidentate ligand such as, for example, 2-phenylpyridine or 1-phenylisoquinoline is cyclometalated by forming an iridium-carbon bond and an iridium-nitrogen bond (see Chemical Formula 1).

[Chemical Formula 1]

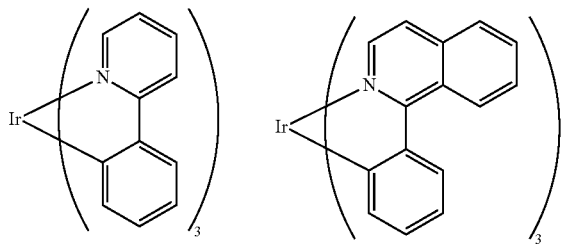

Regarding a method for producing the cyclometalated iridium complex, Patent Document 1 discloses a method in which sodium bis(acetylacetonato)dichloroiridium (III) acid sodium (Chemical Formula 2) as an iridium compound that is a raw material is reacted with an aromatic heterocyclic bidentate ligand such as 2-phenylpyridine or 1-phenylisoquinoline.

[Chemical Formula 2]

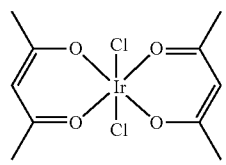

RELATED ART DOCUMENT

Patent Documents

Patent Document 1: WO 2004/085449 A1

SUMMARY OF THE INVENTION

Problems to be Solved by the Invention

However, according to findings of the present inventors, use of an aromatic heterocyclic bidentate ligand in a large amount is required for producing a cyclometalated iridium complex represented by Chemical Formula (1). Specifically, it was revealed that a desired cyclometalated iridium complex was not produced with practical efficiency unless an aromatic heterocyclic bidentate ligand was used in an amount as much as 10 times or more the molar amount of iridium raw material. Many aromatic heterocyclic bidentate ligands are expensive, and this method considerably increases the cost of the cyclometalated iridium complex.

In addition, regarding the problem of the use amount of aromatic heterocyclic bidentate ligand, at least a desired cyclometalated iridium complex can be produced even though a considerably excessive amount of ligand concerned is not used in the method described in Patent Document 1. In such a case, however, by-products such as a halogen-crosslinked iridium dimer are produced, and a desired cyclometalated iridium complex alone cannot be obtained. Rather, a problem emerged that the yield of by-products was higher, and a desired cyclometalated iridium complex could not be obtained with a favorable yield and purity.

Further, additional studies by the present inventor revealed that there was a case where side reactions such as decomposition of reactants proceeded in the method described in Patent Document 1. In this case, the yield of a desired cyclometalated iridium complex is not improved even if the use amount of aromatic heterocyclic bidentate ligand is increased.

The present invention has been made in view of the above-mentioned situations, and discloses a new method with which a cyclometalated iridium complex that is suitably used as a phosphorescent material for an organic EL device can be produced with a high yield and a high purity without by-production of a halogen-crosslinked iridium dimer.

Means for Solving the Problems

For solving the above-described problems, the present invention provides a method for producing a cyclometalated iridium complex, the method including producing a cyclometalated iridium complex by reacting a cyclometalated iridium complex raw material including an organoiridium compound with an aromatic heterocyclic bidentate ligand capable of forming an iridium-carbon bond and an iridium-nitrogen bond, and using as the raw material an organoiridium compound including a substructure represented by the following General Formula (1):

[Chemical Formula 3]

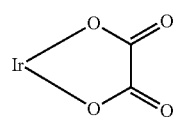

General Formula (1)

(in General Formula (1), Ir represents an iridium atom, and O represents an oxygen atom).

The present inventors have extensively conducted studies on organoiridium compounds which are used as a raw material for a cyclometalated iridium complex and which can be suitably used. Resultantly, the present inventors have revealed that by using an iridium compound including a substructure in which oxalic acid is coordinated to iridium (Chemical Formula 3), a cyclometalated iridium complex can be produced with a favorable yield, leading to the present invention.

In a method for producing a cyclometalated iridium complex of the present invention, a cyclometalated iridium complex can be obtained with a favorable yield without use of an aromatic heterocyclic bidentate ligand in an amount as much as 10 times or more the molar amount of iridium raw material. Thus, the use amount of expensive aromatic heterocyclic bidentate ligand is reduced, so that a cyclometalated iridium complex can be produced at low cost.

Further, with the method for producing a cyclometalated iridium complex of the present invention, production of a halogen-crosslinked iridium dimer which is an undesired by-product can be avoided. When the organoiridium compound which is used as a raw material, and includes a substructure of Chemical Formula 3 does not contain a halogen as a ligand, the effect of avoiding production of a halogen-crosslinked iridium dimer is exhibited, and unexpectedly, even when the organoiridium compound contains a halogen as a ligand, this effect is exhibited.

Hereinafter, the method for producing a cyclometalated iridium complex of the present invention will be described in detail. Hereinafter, (I) iridium raw material, (II) aromatic heterocyclic bidentate ligand and (III) suitable reaction conditions which constitute the present invention will be described.

(1) Iridium Raw Material

As described above, the iridium raw material to be applied in the present invention is an organoiridium compound including a substructure represented by General Formula (1).

A preferred organoiridium compound, among organoiridium compounds including a substructure represented by General Formula (1), is an organoiridium compound represented by the following General Formula (2):

[Chemical Formula 4]

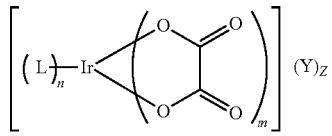

General Formula (2)

(in General Formula (2), Ir represents an iridium atom, and O represents an oxygen atom; L represents a monodentate or bidentate ligand; Y represents a counter cation; Z represents 0 to 3; m represents 1 to 3; and n represents 0 to 4).

In General Formula (2), L represents a monodentate or bidentate ligand. Such a ligand is preferably an aromatic heterocyclic ligand, a halogen atom, an alcohol ligand, an H$_2$O ligand, a nitrile ligand, an isonitrile ligand, a cyano ligand, an isocyanate ligand, a CO ligand or a carboxylic acid ligand, more preferably an aromatic heterocyclic ligand, a halogen atom, an alcohol ligand or a water ligand, especially preferably an aromatic heterocyclic ligand or a halogen atom, more especially preferably a halogen atom.

In General Formula (2), Z represents 0 to 3, preferably 2 or 3, more preferably 3.

In General Formula (2), m represents 1 to 3, preferably 2 or 3. In addition, n represents 0 to 4, preferably 0 or 2. As a combination of m and n, n is preferably 0 when m is 3. When m is 2, n is preferably 1 or 2, more preferably 2. When m is 1, n is preferably 2 or 4, more preferably 2.

In General Formula (2), Y represents a counter cation. The counter cation is not limited as long as it plays a role in forming a salt by setting the overall charge of the iridium compound of General Formula (2) to 0. In particular, a monovalent cation is preferable. Specifically, Y is an alkali metal ion, an ammonium ion, a quaternary ammonium ion, a phosphonium ion, a sulfonium ion, an imidazolium ion, a pyridinium ion, a piperidinium ion, a pyrrolidinium, or a proton, and Y is an alkali metal ion, an ammonium ion, a quaternary ammonium ion, a phosphonium ion, or a sulfonium ion. In particular, Y is preferably an alkali metal ion, an ammonium ion, or a proton, more preferably a sodium ion, a potassium ion, or a proton.

A preferred organoiridium compound, among organoiridium compounds represented by General Formula (2), is an organoiridium compound represented by the following General Formula (3):

[Chemical Formula 5]

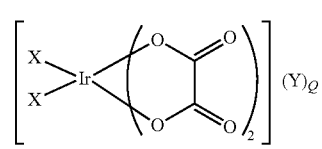

General Formula (3)

(in General Formula (3), Ir represents an iridium atom, and O represents an oxygen atom; X represents a monodentate ligand; Y represents a counter cation; Q represents 2 or 3).

In General Formula (3), X represents a monodentate ligand. Among monodentate ligands, an anionic monodentate ligand is preferable. Such a ligand is preferably an aromatic heterocyclic ligand, a halogen atom, an alcohol ligand, an H$_2$O ligand, a nitrile ligand, an isonitrile ligand, a cyano ligand, an isocyanate ligand or a CO ligand, more preferably a halogen atom, especially preferably a chlorine atom or a bromine atom.

In General Formula (3), Q represents 2 or 3, preferably 3.

In General Formula (3), Y represents a counter cation, and the technical meaning and the preferred range of the counter cation are the same as those of the counter cation in the iridium compound represented by General Formula (2).

Another aspect of the preferred organoiridium compound, among organoiridium compounds represented by General Formula (2), is an organoiridium compound represented by the following General Formula (4):

[Chemical Formula 6]

General Formula (4)

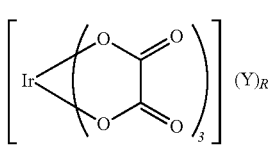

(in General Formula (4), Ir represents an iridium atom, and O represents an oxygen atom; Y represents a counter cation; R represents 2 or 3).

In General Formula (4), R represents 2 or 3, preferably 3.

In General Formula (4), Y represents a counter cation, and the technical meaning and the preferred range of the counter cation are the same as those of the counter cation in the iridium compound represented by General Formula (2) or (3).

In the above-described organoiridium compound of any one of General Formulae (1) to (4) which forms the iridium raw material to be applied in the present invention, the valence of iridium is preferably 3 or 4, more preferably 3.

Here, examples of the iridium compound represented by any one of General Formulae (1) to (4) are shown in Chemical Formulae 7 and 8. Note that the raw material compound in the present invention is not limited to these iridium compounds.

[Chemical Formula 7]

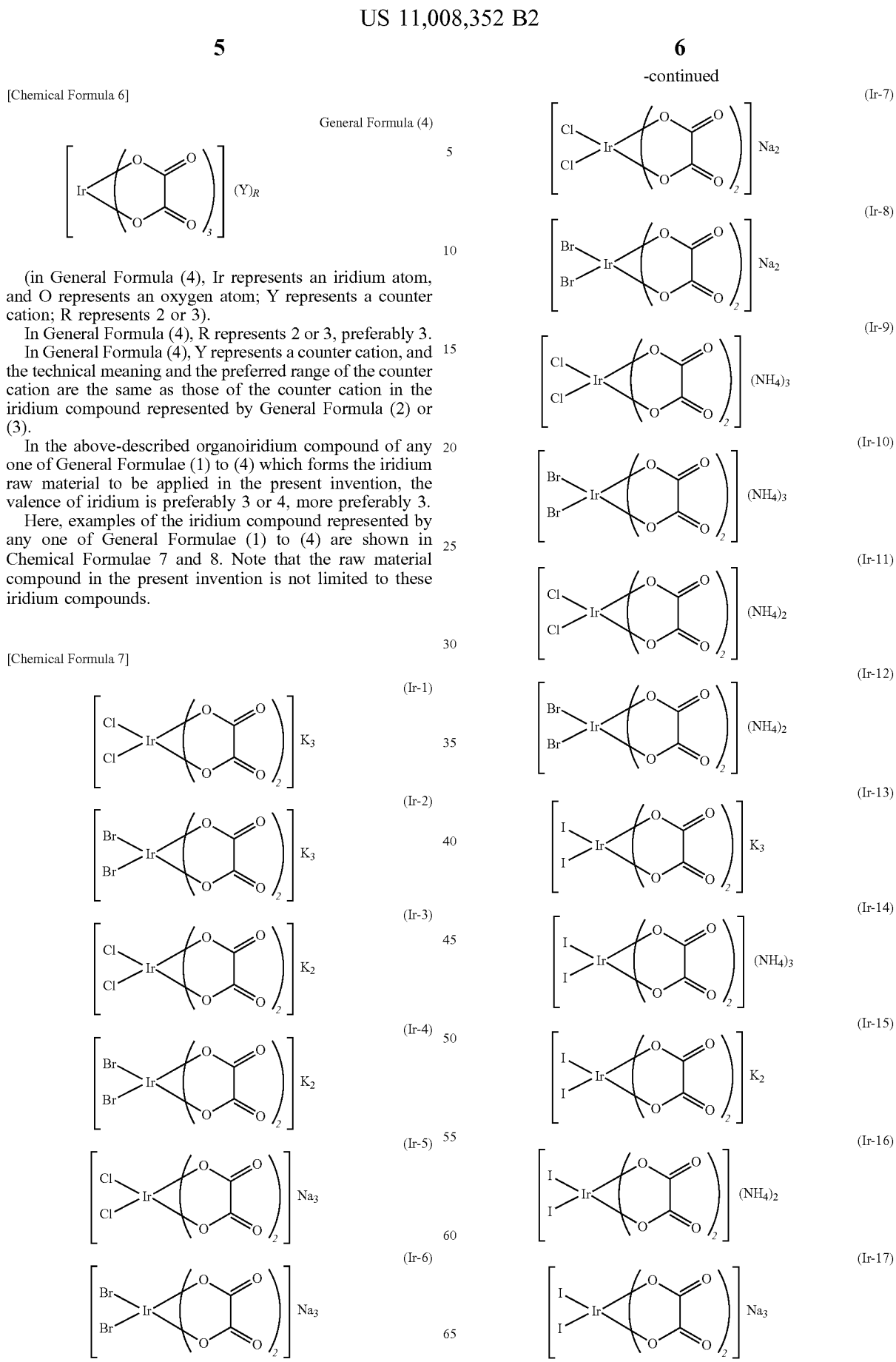

(Ir-18) 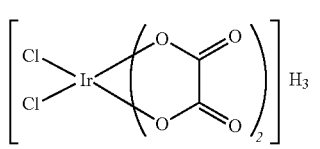

(Ir-19) 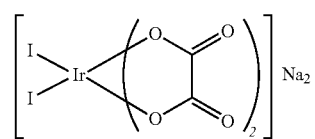

(Ir-20) 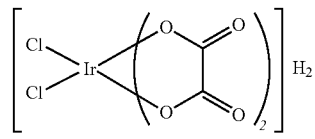

[Chemical Formula 8]

(Ir-21) 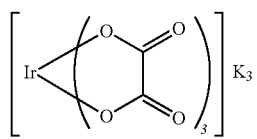

(Ir-22) 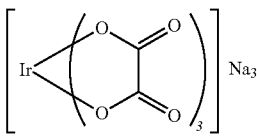

(Ir-23) 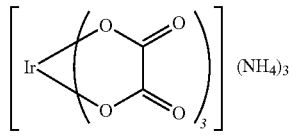

(Ir-24) 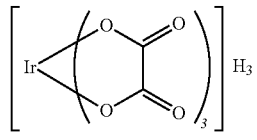

(Ir-25) 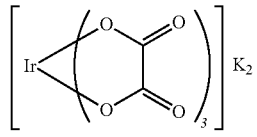

(Ir-26) 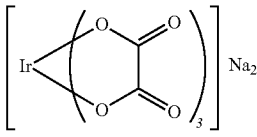

(Ir-27) 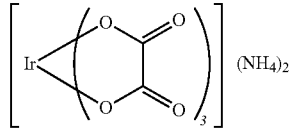

(Ir-28) 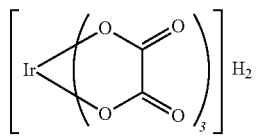

(Ir-29) 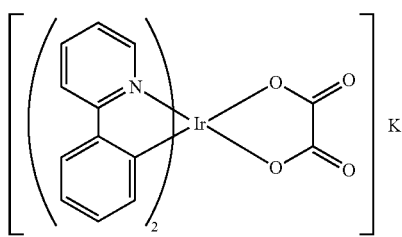

(Ir-30)

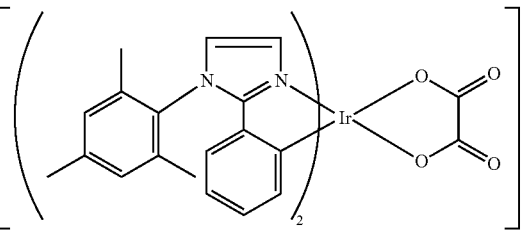

(Ir-31)

(Ir-32)

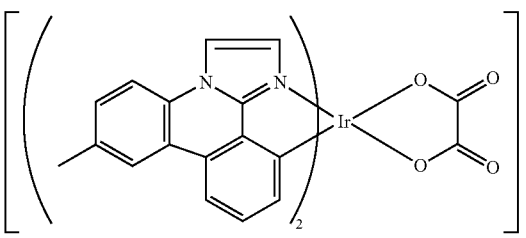

(II) Aromatic Heterocyclic Bidentate Ligand

The method for producing a cyclometalated iridium complex of the present invention includes reacting an aromatic heterocyclic bidentate ligand with the above-described organoiridium compound including a substructure represented by General Formula (1).

The aromatic heterocyclic bidentate ligand in the method for producing a cyclometalated iridium complex of the present invention is preferably one represented by General Formula (5).

[Chemical Formula 9]

General Formula (5)

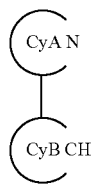

In General Formula (5), N represents a nitrogen atom, C represents a carbon atom, and H represents a hydrogen atom.

CyA represents a five-membered or six-membered cyclic group containing nitrogen atoms, and is linked to iridium via the nitrogen atoms. CyA is preferably a five-membered or six-membered nitrogen-containing aromatic heterocyclic ring.

CyB represents a five-membered or six-membered cyclic group containing nitrogen atoms, and is linked to iridium via the nitrogen atoms. CyB is preferably a five-membered or six-membered aromatic carbon ring or aromatic heterocyclic ring, more preferably a five-membered or six-membered aromatic carbon ring or nitrogen-containing aromatic heterocyclic ring, especially preferably a five-membered or six-membered aromatic carbon ring.

CyA and CyB may be linked together to form a new ring structure. Here, CyA and CyB are preferably linked together to form a new saturated ring or unsaturated ring, more preferably an unsaturated ring.

Examples of the five-membered or six-membered cyclic group containing nitrogen atoms include a pyridine ring, a pyrimidine ring, a pyrazine ring, a pyridazine ring, a quinoline ring, an isoquinoline ring, a quinoxaline ring, a cinnoline ring, a phthalazine ring, a quinazoline ring, a naphthyridine ring, an imidazole ring, a pyrazole ring, a triazole ring, a tetrazole ring, an oxazole ring, an oxadiazole ring, a thiazole ring, and a thiadiazole ring. Among them, a pyridine ring, a pyrimidine ring, a quinoline ring, an isoquinoline ring, an imidazole ring, a pyrazole ring, and a triazole ring are preferable, a pyridine ring, a quinoline ring, an isoquinoline ring, and an imidazole ring are more preferable, and a pyridine ring, an isoquinoline ring, and an imidazole ring are especially preferable.

Specific examples of the five-membered or six-membered cyclic group containing carbon atoms include a benzene ring, a naphthalene ring, an anthracene ring, a carbazole ring, a fluorene ring, a furan ring, a thiophene ring, a pyridine ring, a pyrimidine ring, a pyrazine ring, a pyridazine ring, a quinoline ring, an isoquinoline ring, a quinoxaline ring, a cinnoline ring, a phthalazine ring, a quinazoline ring, a naphthyridine ring, an imidazole ring, a pyrazole ring, a triazole ring, a tetrazole ring, an oxazole ring, an oxadiazole ring, a thiazole ring, and a thiadiazole ring. A benzene ring, a naphthalene ring, a pyridine ring, and a pyrimidine ring are preferable, a benzene ring, a pyridine ring, and a pyrimidine ring are more preferable, and a benzene ring is especially preferable.

Regarding a ring formed by linkage of CyA and CyB, CyA and CyB are preferably linked together to form a benzoquinoxaline ring, a benzoquinoline ring, a dibenzoquinoxaline ring, a dibenzoquinoline ring, or a phenanthridine ring, more preferably a benzoquinoline ring, a dibenzoquinoxaline ring, or a phenanthridine ring. The benzoquinoline ring is preferably a benzo[h]quinoline ring. The dibenzoquinoxaline ring is preferably a dibenzo[f,h] quinoxaline ring. The phenanthridine ring is preferably an imidazo[1,2-f]phenanthridine ring.

CyA, CyB and the ring formed by linkage of CyA and CyB may have substituents, may have adjacent substituents linked together to form a ring structure, and may be further substituted.

Examples of CyA, CyB, and the substituent which is linked to a ring formed by linkage of CyA and CyB include the following groups.

Alkyl groups (with a carbon number of preferably 1 or more and 30 or less, more preferably 1 or more and 20 or less, especially preferably 1 or more and 10 or less, e.g. methyl, ethyl, iso-propyl, tert-butyl, n-octyl, n-decyl, n-hexadecyl, cyclopropyl, cyclopentyl, and cyclohexyl).

Alkenyl groups (with a carbon number of preferably 2 or more and 30 or less, more preferably 2 or more and 20 or less, especially preferably 2 or more and 10 or less, e.g. vinyl, allyl, 2-butenyl, and 3-pentenyl).

Alkynyl groups (with a carbon number of preferably 2 or more and 30 or less, more preferably 2 or more and 20 or less, especially preferably 2 or more and 10 or less, e.g. propargyl and 3-pentynyl).

Aryl groups (with a carbon number of preferably 6 or more and 30 or less, more preferably 6 or more and 20 or less, especially preferably 6 or more and 12 or less, e.g. phenyl, p-methylphenyl, naphthyl, and anthranil).

Amino groups (with a carbon number of preferably 0 or more and 30 or less, more preferably 0 or more and 20 or less, especially preferably 0 or more and 10 or less, e.g. amino, methylamino, dimethylamino, diethylamino, dibenzylamino, diphenylamino, and ditolylamino).

Alkoxy groups (with a carbon number of preferably 1 or more and 30 or less, more preferably 1 or more and 20 or less, especially preferably 1 or more and 10 or less, e.g. methoxy, ethoxy, butoxy, and 2-ethylhexyloxy).

Aryloxy groups (with a carbon number of preferably 6 or more and 30 or less, more preferably 6 or more and 20 or less, especially preferably 6 or more and 12 or less, e.g. phenyloxy, 1-naphthyloxy, and 2-naphthyloxy).

Heterocyclic oxy groups (with a carbon number of preferably 1 or more and 30 or less, more preferably 1 or more and 20 or less, especially preferably 1 or more and 12 or less, e.g. pyridyloxy, pyrazyloxy, pyrimidyloxy, and quinolyloxy).

Acyl groups (with a carbon number of preferably 1 or more and 30 or less, more preferably 1 or more and 20 or less, especially preferably 1 or more and 12 or less, e.g. acetyl, benzoyl, formyl, and pivaloyl).

Alkoxycarbonyl groups (with a carbon number of 2 or more and 30 or less, more preferably 2 or more and 20 or less, especially preferably 2 or more and 12 or less, e.g. methoxycarbonyl and ethoxycarbonyl).

Aryloxycarbonyl groups (with a carbon number of preferably 7 or more and 30 or less, more preferably 7 or more and 20 or less, especially preferably 7 or more and 12 or less, e.g. phenyloxycarbonyl).

Acyloxy groups (with a carbon number of preferably 2 or more and 30 or less, more preferably 2 or more and 20 or less, especially preferably 2 or more and 10 or less, e.g. acetoxy and benzoyloxy).

Acylamino groups (with a carbon number of preferably 2 or more and 30 or less, more preferably 2 or more and 20 or less, especially preferably 2 or more and 10 or less, e.g. acetylamino and benzoylamino).

Alkoxycarbonylamino groups (with a carbon number of 2 or more and 30 or less, more preferably 2 or more and 20 or less, especially preferably 2 or more and 12 or less, e.g. methoxycarbonylamino).

Aryloxycarbonylamino groups (with a carbon number of preferably 7 or more and 30 or less, more preferably 7 or more and 20 or less, especially preferably 7 or more and 12 or less, e.g. phenyloxycarbonylamino).

Sulfonylamino groups (with a carbon number of preferably 1 or more and 30 or less, more preferably 1 or more and 20 or less, especially preferably 1 or more and 12 or less, e.g. methanesulfonylamino and benzenesulfonylamino).

Sulfamoyl groups (with a carbon number of preferably 0 or more and 30 or less, more preferably 0 or more and 20 or less, especially preferably 0 or more and 12 or less, e.g. sulfamoyl, methylsulfamoyl, dimethylsulfamoyl, and phenylsulfamoyl).

Carbamoyl groups (with a carbon number of preferably 1 or more and 30 or less, more preferably 1 or more and 20 or less, especially preferably 1 or more and 12 or less, e.g. carbamoyl, methylcarbamoyl, diethylcarbamoyl, and phenylcarbamoyl).

Alkylthio groups (with a carbon number of preferably 1 or more and 30 or less, more preferably 1 or more and 20 or less, especially preferably 1 or more and 12 or less, e.g. methylthio and ethylthio).

Arylthio groups (with a carbon number of preferably 6 or more and 30 or less, more preferably 6 or more and 20 or less, especially preferably 6 or more and 12 or less, e.g. phenylthio).

Heterocyclic thio groups (with a carbon number of preferably 1 or more and 30 or less, more preferably 1 or more and 20 or less, especially preferably 1 or more and 12 or less, e.g. pyridylthio, 2-benzimizolylthio, 2-benzoxazolylthio, and 2-benzthiazolylthio).

Sulfonyl groups (with a carbon number of preferably 1 or more and 30 or less, more preferably 1 or more and 20 or less, especially preferably 1 or more and 12 or less, e.g. mesyl and tosyl).

Sulfinyl groups (with a carbon number of preferably 1 or more and 30 or less, more preferably 1 or more and 20 or less, especially preferably 1 or more and 12 or less, e.g. methanesulfinyl and benzenesulfinyl).

Ureide groups (with a carbon number of preferably 1 or more and 30 or less, more preferably 1 or more and 20 or less, especially preferably 1 or more and 12 or less, e.g. ureide, methylureide, and phenylureide).

Phosphoramide groups (with a carbon number of preferably 1 or more and 30 or less, more preferably 1 or more and 20 or less, especially preferably 1 or more and 12 or less, e.g. diethylphosphoramide and phenylphosphoramide).

Hydroxyl groups, mercapto groups, halogen atoms (e.g. fluorine atom, chlorine atom, bromine atom, and iodine atom), cyano groups, sulfo groups, carboxyl groups, nitro groups, trifluoromethyl groups, hydroxamic acid groups, sulfino groups, hydrazino groups, imino groups, and heterocyclic groups (with a carbon number of preferably 1 or more and 30 or less, more preferably 1 or more and 12 or less and with a nitrogen atom, an oxygen atom, or a sulfur atom as a heteroatom, specifically, imidazolyl, pyridyl, quinolyl, furyl, thienyl, piperidyl, morpholino, benzoxazolyl, benzimidazolyl, benzothiazolyl, carbazolyl group, azepinyl group, and the like).

Silyl groups (with a carbon number of preferably 3 or more and 40 or less, more preferably 3 or more and 30 or less, especially preferably 3 or more and 24 or less, e.g. trimethylsilyl and triphenylsilyl).

Silyloxy groups (with a carbon number of preferably 3 or more and 40 or less, more preferably 3 or more and 30 or less, especially preferably 3 or more and 24 or less, e.g. trimethylsilyloxy and triphenylsilyloxy).

Among the above-mentioned substituents, alkyl groups, aryl groups, amino groups, alkoxy groups, aryloxy groups, halogen atoms, cyano groups, trifluoromethyl groups, heterocyclic groups, and silyl groups are preferable, alkyl groups, aryl groups, halogen atoms, cyano groups, and heterocyclic groups are more preferable, and alkyl groups and aryl groups are especially preferable. Among these substituents, those that are desirable are as described above, and these substituents may be further substituted with the above-mentioned substituents. Adjacent substituents may be linked together to form a ring structure.

As a desired form of the aryl group or heterocyclic group, a dendron (a group having a regular dendritic branched structure with a branch point at an atom or ring) is also preferable. Examples of the dendron include structures described in documents such as WO 02/067343 A1, JP 2003-231692 A, WO 2003/079736 A1, WO 2006/097717 A1, and WO 2016/006523 A1.

Examples of the specific preferred structure of the aromatic heterocyclic bidentate ligand of General Formula (5) for use in the present invention include structures shown in Chemical Formula 10 and represented by General Formulae (7) to (18). Among them, aromatic heterocyclic bidentate ligands having the structures of General Formulae (7) to (10) are preferable, aromatic heterocyclic bidentate ligand having the structures of General Formulae (7), (9) and (10) are more preferable, and an aromatic heterocyclic bidentate ligand having the structure of General Formula (10) is especially preferable.

[Chemical Formula 10]

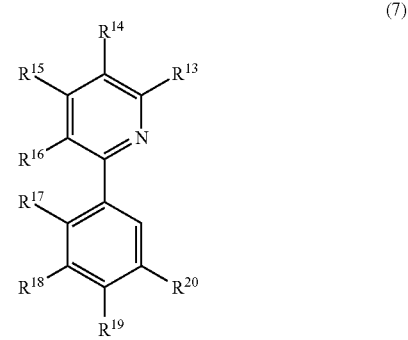

(7)

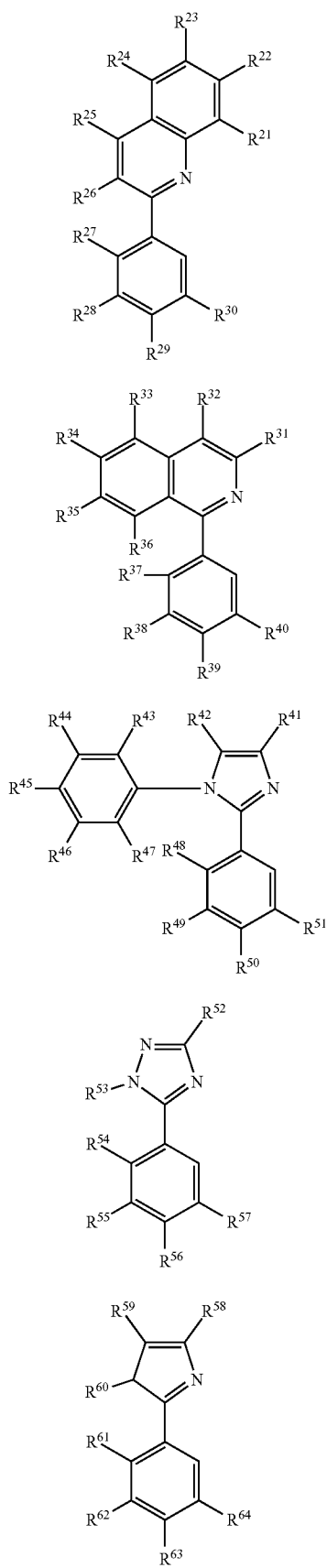

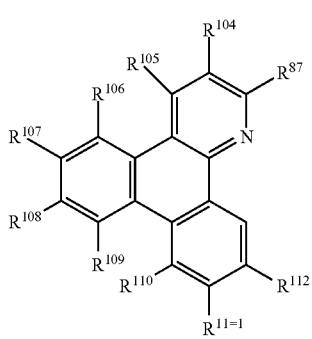

(18)

(In Formulae (7) to (18), $R^{13}$ to $R^{112}$ each independently represent a hydrogen atom or a substituent; adjacent substituents may be linked together to further form a ring structure; and the substituents $R^{13}$ to $R^{112}$ have the same meanings as those of the substituents described in CyA and CyB, and the same applies to a desired range).

In the present invention, the organoiridium compound including a structure represented by General Formula (1) is reacted with the aromatic heterocyclic bidentate ligand to produce a cyclometalated iridium complex. A preferred structure as the cyclometalated iridium complex is represented by General Formula (6).

[Chemical Formula 11]

General Formula (6)

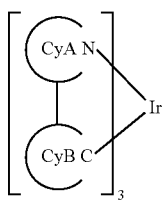

(In General Formula (6), Ir represents an iridium atom, N represents a nitrogen atom, C represents a carbon atom, CyA represents a five-membered or six-membered cyclic group containing nitrogen atoms, and is linked to iridium via the nitrogen atoms, and CyB represents a five-membered or six-membered cyclic group containing carbon atoms, and is linked to iridium via the carbon atoms; and CyA and CyB may be linked together to further form a ring structure), The definitions of N, C, CyA and CyB in General Formula (6) have the same meanings as in General Formula (5), and the same applies to the details of N, C, CyA and CyB, and the range of substituents to which N, C, CyA and CyB can be bonded.

(III) Suitable Reaction Conditions

Preferred reaction conditions in the method for producing a cyclometalated iridium complex of the present invention will be described.

Preferably, a solvent is used in the method for producing a cyclometalated iridium complex of the present invention. As the solvent, for example, an alcohol, a saturated aliphatic hydrocarbon, an ester, an ether, a nitrile, an aprotic polar solvent, a ketone, an amide, an aromatic hydrocarbon, a nitrogen-containing aromatic compound, an ionic liquid or water is preferable. In particular, the solvent is more preferably an alcohol, a saturated aliphatic hydrocarbon, an ester, an ether, an aprotic polar solvent, or an amide, especially preferably an alcohol or an aprotic polar solvent (DMF, DMSO, or the like), even more preferably an alcohol (with a carbon number of preferably 1 or more and 30 or less, more preferably 1 or more and 20 or less, still more preferably 1 or more and 10 or less). Among alcohols, diol (with a carbon number of preferably 1 or more and 30 or less, more preferably 1 or more and 20 or less, still more preferably 1 or more and 10 or less) is most preferable. Specifically, ethylene glycol, diethylene glycol, triethylene glycol, 1,2-propanediol, 1,3-propanediol, and 1,3-butanediol are preferable.

The above-mentioned solvents may be used singly, or two or more of the solvents may be used in combination.

In the method for producing a cyclometalated iridium complex of the present invention, the concentration of the iridium compound of General Formula (1) in the reaction system is not particularly limited, but is preferably 0.001 mol/L or more and 10.0 mol/L or less, more preferably 0.001 mol/L or more and 1.0 mol/L or less, still more preferably 0.01 mol/L or more and 1.0 mol/L or less, especially preferably 0.05 mol/L or more and 0.5 mol/L or less.

In addition, in the method of the present invention, the use amount of aromatic heterocyclic bidentate ligand is preferably 3 times or more and less than 10 times, more preferably 3 times or more and less than 8 times, still more preferably 3 times or more and 6 times or less the molar amount of organoiridium compound having a substructure represented by General Formula (1).

Thus, in the present invention, it is not necessary to use an aromatic heterocyclic bidentate ligand in an amount as much as 10 times or more the molar amount of organoiridium compound as a raw material for producing a cyclometalated iridium complex. Thus, the use amount of expensive aromatic heterocyclic bidentate ligand is reduced, so that the cost of the cyclometalated iridium complex can be reduced.

In addition, in the reaction for synthesis of the cyclometalated iridium complex in the present invention, synthesis may be performed with an acidic substance added in the reaction system for acceleration of the reaction. Addition of an acidic substance may have an effect of accelerating desorption of an oxalic acid ligand in the organoiridium compound. Note that addition of an acidic substance is not essential.

When an acidic substance is added, an acidic substance that acts as a proton source in the reaction system, or an acidic substance capable of accepting an electron pair like a solid acid or the like can be applied. In particular, Broensted acids such as organic acids such as acetic acid, oxalic acid, valeric acid, butyric acid and tartaric acid, and inorganic acids such as hydrochloric acid, sulfuric acid and phosphoric acid are preferable. These acids can be used singly, or as a mixture of two or more of the acids. In addition, the boiling point of the acidic substance is preferably 150° C. or higher. This is because when the boiling point of the acidic substance is lower than the reaction temperature, the acidic acid is refluxed, so that the temperature in the reaction system is hardly elevated to a temperature sufficient for the reaction to proceed.

When the acidic substance is added, the molar ratio of the acidic substance to the iridium raw material is preferably such that the amount of acidic substance is 0.5 moles or more based on 1 mole of the iridium raw material. It is not preferable that the amount of acidic substance is less than 0.5 moles based on 1 mole of the iridium compound because a sufficient reaction acceleration effect is not obtained, and thus the reaction cannot be completed in a short time. The upper limit of the molar ratio of the acidic substance to the iridium raw material is not particularly limited as long as the amount of acidic substance is 0.5 moles or more based on 1 mole of the iridium raw material, but when the added amount of acidic substance is unnecessarily large, economic efficiency is deteriorated. The molar ratio of the acidic substance to the iridium raw material is more preferably 0.5:1 to 20:1, still more preferably 1:1 to 10:1.

In the method for producing a cyclometalated iridium complex of the present invention, it is preferable that the reaction including the iridium compound and the aromatic heterocyclic bidentate ligand is heated. The reaction temperature here is 50° C. or higher and lower than 300° C. The reaction temperature is preferably 50° C. or higher and lower than 250° C., more preferably 100° C. or higher and lower than 250° C., still more preferably 140° C. or higher and lower than 220° C., especially preferably 140° C. or higher and lower than 200° C. The heating means here is not particularly limited. Specifically, external heating using an oil bath, a sand bath, a mantle heater, a block heater, or a heat-circulation jacket, as well as heating by irradiation with microwaves can be utilized, for example.

In the method for producing a cyclometalated iridium complex of the present invention, the reaction time is not particularly limited. The reaction time is preferably 0.5 hours or more and less than 72 hours, more preferably 1 hour or more and less than 48 hours, still more preferably 1 hour or more and less than 24 hours.

In the method for producing a cyclometalated iridium complex of the present invention, it is preferable that the reaction is carried out under an inert gas (e.g. nitrogen or argon) atmosphere. In addition, it is preferable that the reaction is carried out at normal pressure (under atmospheric pressure).

The cyclometalated iridium complex produced by the method of the present invention is treated by a general post-treatment method and then, after purification as necessary or without purification, can be used as a high-purity product. As the method for post-treatment, for example, extraction, cooling, crystallization by adding water or an organic solvent, distillation of the solvent from the reaction mixture, and like operations may be performed alone or in combination. As the method for purification, recrystallization, distillation, sublimation, column chromatography, and the like may be performed alone or in combination.

The cyclometalated iridium complex produced by the above-described method of the present invention can be suitably used as a phosphorescent material for organic EL devices etc.

Advantageous Effects of the Invention

Of the present invention, a cyclometalated iridium complex to be suitably used as a phosphorescent material for organic EL devices etc. can be produced with a high yield and a high purity. In the present invention, a halogen-crosslinked iridium dimer which is an undesired by-product is not produced, and the production efficiency of a desired cyclometalated iridium complex can be considerably improved.

An iridium compound which is applied in the present invention, and includes a substructure represented by the above General Formula (1) is useful as a raw material for production of a cyclometalated iridium complex. By using the iridium compound, a desires cyclometalated iridium complex can be efficiently produced with a favorable purity.

DESCRIPTION OF EMBODIMENTS

Hereinafter, an embodiment of the present invention will be described in detail. In this embodiment, an organoiridium compound including a substructure represented by General Formula (1) was synthesized, and the organoiridium compound was reacted with an aromatic heterocyclic bidentate ligand to produce a cyclometalated iridium complex. This embodiment is one example of the present invention, and the present invention is not limited to this embodiment.

Various compounds mentioned in examples and comparative examples of this embodiment are shown in Chemical Formula 12 below. In this embodiment, the following iridium compound (Ir-1) or (Ir-24) was produced as an iridium compound raw material, and used as a raw material, and the following ligands (L-1) to (L-4) were used as aromatic heterocyclic bidentate ligands to produce the following cyclometalated iridium complexes (T-1) to (T-4), respectively (Examples 1 to 7). In addition, as comparative examples, an attempt was made to produce cyclometalated iridium complexes (T-1) and (T-4) by use of bis(acetylacetonato) dichloroiridium (III) acid sodium (comparative compound-A) (Comparative Examples 1 and 2).

[Chemical Formula 12]

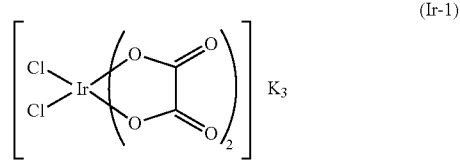

(Ir-1)

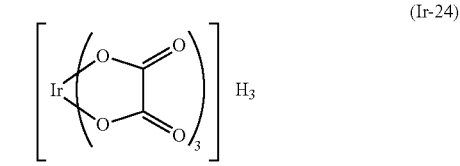

(Ir-24)

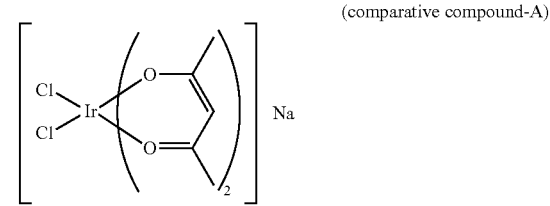

(comparative compound-A)

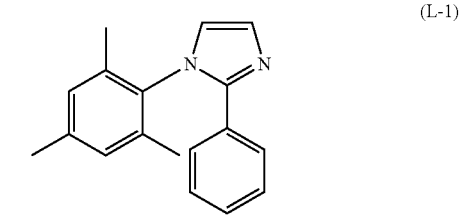

(L-1)

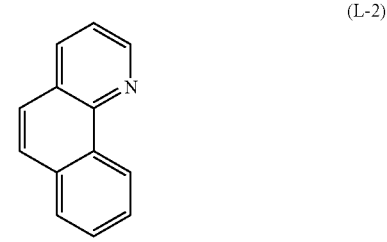

(L-2)

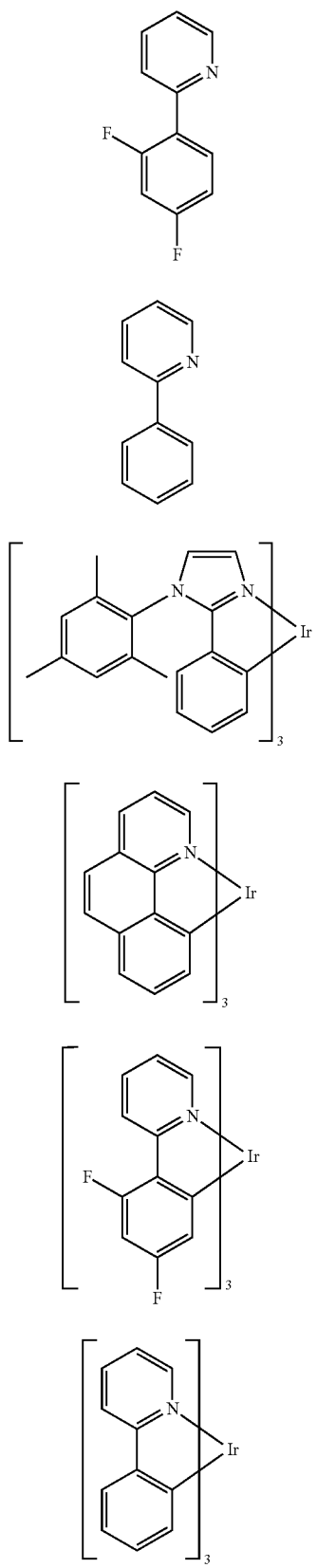

(L-3)

(L-4)

(T-1)

(T-2)

(T-3)

(T-4)

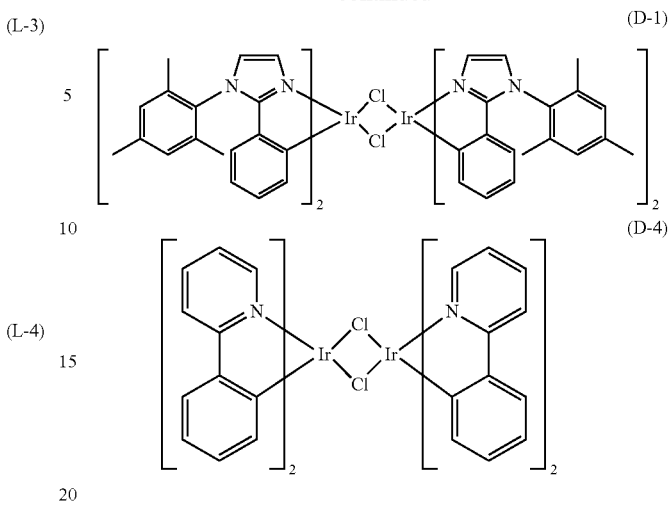

(D-1)

(D-4)

The iridium compound (Ir-1), the iridium compound (Ir-24) and the iridium compound (comparative compound-A) used as raw materials for the cyclometalated iridium complexes in this embodiment were produced in the following manner.

[Method for Producing Iridium Compound (Ir-1)]

28.6 g (52.0 mmol) of potassium hexachloroiridate hydrate was dissolved in 150 ml of pure water, 27.1 g (147.1 mmol) of potassium oxalate monohydrate was added, and the mixture was reacted at 98° C. for 23 hours. After the reaction, the reaction product was allowed to cool, and concentrated to obtain a precipitated crude crystal. The crude crystal was recrystallized with pure water to obtain 13.0 g of a crystal of the iridium compound (Ir-1).

[Method for Producing Iridium Compound (Ir-24)]

18.9 g (52.0 mmol) of iridium trichloride trihydrate was dissolved in 250 ml of pure water, 1.1 g (8.8 mmol) of oxalic acid dihydrate was added, and the mixture was reacted at 95° C. for 2 hours. Further, 340 g of a 10% potassium hydroxide aqueous solution was added dropwise, and the mixture was then reacted at 95° C. for 3 hours. After the reaction, the reaction product was allowed to cool, and filtered, and the residues were washed with water. Subsequently, to 20.7 g of the residues were added 250 ml of pure water and 43.3 g (343.2 mmol) of oxalic acid dihydrate, and the mixture was reacted at 95° C. for 22 hours. After the reaction, the reaction product was allowed to cool, and filtered, and the filtrate was concentrated to obtain 27.0 g of a crude crystal. The crude crystal was repeatedly recrystallized with pure water to obtain 6.6 g of a crystal of the iridium compound (Ir-24).

[Method for Producing Iridium Compound (Comparative Compound-A)]

37.1 g (105 mmol) of iridium trichloride trihydrate was dissolved in 200 ml of pure water, 200 ml of 1 M sodium hydrogen carbonate and 20.5 ml (200 mmol) of acetylacetone were added, and the mixture was reacted at 95° C. for 10 hours. After the reaction, the reaction product was dried by vacuum drying, 400 ml of methanol was added, and the mixture was refluxed for 8 hours, and then filtered. The filtrate was concentrated, and cold methanol was added to obtain 13.0 g of a crystal of the iridium compound (comparative compound-A).

<Example 1>: Synthesis of Cyclometalated Iridium Complex (T-1)

117.7 mg (0.2 mmol) of the iridium compound (Ir-1), 314.8 mg (1.2 mmol) of the ligand (L-1) and 1.7 ml of ethylene glycol were mixed, and the mixture was heated and reacted in an argon atmosphere at 180° C. for 4 hours. After completion of the reaction, the reaction solution was cooled to room temperature, and a yellow solid precipitated by adding methanol to the reaction solution was recovered. The result of analysis of $^1$H-NMR showed that the product was a desired cyclometalated iridium complex (T-1), and the yield was 75%.

<Example 2>: Synthesis of Cyclometalated Iridium Complex (T-1)

117.7 mg (0.2 mmol) of the iridium compound (Ir-1), 314.8 mg (1.2 mmol) of the ligand (L-1) and 1.7 ml of ethylene glycol were mixed, and the mixture was heated and reacted in an argon atmosphere at 180° C. for 17 hours. After completion of the reaction, the reaction solution was cooled to room temperature, and a yellow solid precipitated by adding methanol to the reaction solution was recovered. The result of analysis of $^1$H-NMR showed that the product was a desired cyclometalated iridium complex (T-1), and the yield was 81%.

<Example 3>: Synthesis of Cyclometalated Iridium Complex (T-1)

117.7 mg (0.2 mmol) of the iridium compound (Ir-1), 183.6 mg (0.7 mmol) of the ligand (L-1) and 1.7 ml of ethylene glycol were mixed, and the mixture was heated and reacted in an argon atmosphere at 160° C. for 34 hours. After completion of the reaction, the reaction solution was cooled to room temperature, and a yellow solid precipitated by adding methanol to the reaction solution was recovered. The result of analysis of $^1$H-NMR showed that the product was a desired cyclometalated iridium complex (T-1), and the yield was 69%.

<Example 4>: Synthesis of Cyclometalated Iridium Complex (T-1)

117.7 mg (0.2 mmol) of the iridium compound (Ir-1), 314.8 mg (1.2 mmol) of the ligand (L-1) and 0.5 nil of glycerin were mixed, and the mixture was heated and reacted in an argon atmosphere at 180° C. for 4 hours.

After completion of the reaction, the reaction solution was cooled to room temperature, and a yellow solid precipitated by adding methanol to the reaction solution was recovered. The result of analysis of $^1$H-NMR showed that the product was a desired cyclometalated iridium complex (T-1), and the yield was 73%.

<Comparative Example 1>: Synthesis of Cyclometalated Iridium Complex (T-1) (Comparative Compound-A)

145.3 mg (0.3 mmol) of the comparative compound-A, 472.1 mg (1.8 mmol) of the ligand (L-1) and 2.5 ml of ethylene glycol were mixed, and the mixture was heated and reacted in an argon atmosphere at 180° C. for 17 hours. After completion of the reaction, the reaction solution was cooled to room temperature, and a yellow solid precipitated by adding methanol to the reaction solution was recovered. The result of analysis of $^1$H-NMR showed that the product was a mixture of a desired cyclometalated iridium complex (T-1) and a halogen-crosslinked iridium dimer (D-1). The yield of each of (T-1) and (D-1) was 13%.

<Example 5>: Synthesis of Cyclometalated Iridium Complex (T-2)

117.7 mg (0.2 mmol) of the iridium compound (Ir-1), 215.0 mg (1.2 mmol) of the ligand (L-2) and 1.7 ml of ethylene glycol were mixed, and the mixture was heated and reacted in an argon atmosphere at 180° C. for 17 hours. After completion of the reaction, the reaction solution was cooled to room temperature, and a yellowish orange solid precipitated by adding methanol to the reaction solution was recovered. The result of analysis of $^1$H-NMR showed that the product was a desired cyclometalated iridium complex (T-2), and the yield was 70%.

<Example 6>: Synthesis of Cyclometalated Iridium Complex (T-3)

117.7 mg (0.2 mmol) of the iridium compound (Ir-1), 229.4 ring (1.2 mmol) of the ligand (L-3) and 1.7 ml of ethylene glycol were mixed, and the mixture was heated and reacted in an argon atmosphere at 180° C. for 17 hours. After completion of the reaction, the reaction solution was cooled to room temperature, and a yellow solid precipitated by adding methanol to the reaction solution was recovered. The result of analysis of $^1$H-NMR showed that the product was a desired cyclometalated iridium complex (T-3), and the yield was 77%.

<Example 7>: Synthesis of Cyclometalated Iridium Complex (T-4)

117.7 mg (0.2 mmol) of the iridium compound (Ir-1), 186.2 mg (1.2 mmol) of the ligand (L-4), 23.1 mg (0.2 mmol) of 85% a phosphoric acid aqueous solution and 5 ml of ethylene glycol were mixed, and the mixture was heated and reacted in an argon atmosphere at 180° C. for 17 hours. After completion of the reaction, the reaction solution was cooled to room temperature, and a yellow solid precipitated by adding methanol to the reaction solution was recovered. The result of analysis of $^1$H-NMR showed that the product was a desired cyclometalated iridium complex (T-4), and the yield was 94%.

<Example 8>: Synthesis of Cyclometalated Iridium Complex (T-4)

104.2 mg (0.2 mmol) of the iridium compound (Ir-24), 186.2 mg (1.2 mmol) of the ligand (L-4) and 5 ml of ethylene glycol were mixed, and the mixture was heated and reacted in an argon atmosphere at 180° C. for 17 hours. After completion of the reaction, the reaction solution was cooled to room temperature, and a yellow solid precipitated by adding methanol to the reaction solution was recovered. The result of analysis of $^1$H-NMR showed that the product was a desired cyclometalated iridium complex (T-4), and the yield was 55%.

<Comparative Example 2>: Synthesis of Cyclometalated Iridium Complex (T-4) (Comparative Compound-A)

145.3 mg (0.3 mmol) of the comparative compound-A, 163.0 mg (1.05 mmol) of the ligand (L-4) and 2.5 ml of ethylene glycol were mixed, and the mixture was heated and reacted in an argon atmosphere at 180° C. for 17 hours. After completion of the reaction, the reaction solution was cooled to room temperature, and a yellow solid precipitated by adding methanol to the reaction solution was recovered. The result of analysis of ¹H-NMR showed that the product was a mixture of a desired cyclometalated iridium complex (T-4) and a halogen-crosslinked iridium dimer (D-4). The yield of (T-4) and (D-4) were 22% and 73%, respectively.

The results of the synthesis tests of cyclometalated iridium complexes in Examples 1 to 7 and Comparative Examples 1 and 2 will be examined. First, examination of the results in Examples 1 to 4 showed that by using the iridium compound (Ir-1) as a raw material, a desired cyclometalated iridium complex alone was obtained. On the other hand, it was revealed that in Comparative Example 1 using the conventional comparative compound-A as a raw material, an undesired halogen-crosslinked iridium dimer was by-produced, leading to a considerable reduction in yield and purity of a desired cyclometalated iridium complex. In this respect, the iridium compound (Ir-1) used in Examples 1 to 4 was an organoiridium compound containing a halogen as a ligand in a structure of the compound, but production of a halogen-crosslinked iridium dimer was suppressed.

In addition, the results in Examples 5 to 7 showed that the production method of the present invention using the iridium compound (Ir-1) as a raw material was applicable to synthesis of a variety of cyclometalated iridium complexes having different aromatic heterocyclic bidentate ligands.

Further, it was shown that in Example 8, the desired cyclometalated iridium complex (T-4) alone was obtained by use of the iridium compound (Ir-24) as a raw material. On the other hand, it was revealed that in Comparative Example 2 where an attempt was made to produce the cyclometalated iridium complex (T-4) as in Example 8 while the conventional comparative compound-A was used as a raw material, the undesired halogen-crosslinked iridium dimer (D-4) was by-produced, leading to a considerable reduction in yield and purity of the desired cyclometalated iridium complex (T-4).

The above results in examples indicate that the present invention is useful over a wide range. Further, it is apparent from the reaction conditions in examples in the present invention, a cyclometalated iridium complex can be produced without use of an aromatic heterocyclic bidentate ligand in an amount as much as 10 times or more the molar amount of iridium raw material. In addition, a cyclometalated iridium complex with a high purity is obtained, and therefore it may be possible to considerably reduce costs associated with purification and production.

INDUSTRIAL APPLICABILITY

The present invention is capable of producing a cyclometalated iridium complex which is a phosphorescent material for, for instance, organic EL devices can be produced with a favorable yield and a favorable purity. Further, an organic EL device or the like with high efficiency can be produced by using a cyclometalated iridium complex produced by the method of the present invention. The present invention is extremely useful as a method for producing a cyclometalated iridium complex that is used as a phosphorescent material to be used for organic electroluminescent (EL) devices, organic electrochemiluminescent (ECL) devices, luminescent sensors, photosensitizing pigments, photocatalysts, luminescent probes, various light sources, and the like.

The invention claimed is:
1. A method for producing a cyclometalated iridium complex, the method comprising:
producing a cyclometalated iridium complex by reacting a cyclometalated iridium complex raw material including an organoiridium compound with an aromatic heterocyclic bidentate ligand capable of forming an iridium-carbon bond and an iridium-nitrogen bond; and
using as the raw material an organoiridium compound including a substructure represented by the following General Formula (1):

[Chemical Formula 1]

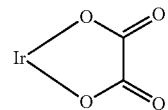

General Formula (1)

(in General Formula (1), Ir represents an iridium atom, and O represents an oxygen atom),
wherein
the aromatic heterocyclic bidentate ligand is represented by General Formula (5), and
the cyclometalated iridium complex is represented by General Formula (6):

[Chemical Formula 5]

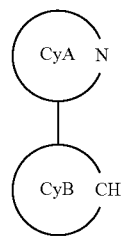

General Formula (5)

(in General Formula (5), N represents a nitrogen atom, C represents a carbon atom, H represents a hydrogen atom, CyA is any one of a pyridine ring, a quinoline ring, an isoquinoline ring, an imidazole ring, and a triazole ring, CyB is a benzene ring, and CyA and CyB are optionally linked together to form a ring structure); and

[Chemical Formula 6]

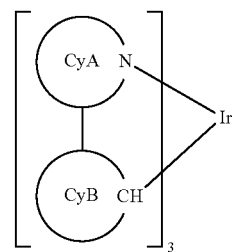

General Formula (6)

(In General Formula (6), Ir represents an iridium atom, N represents a nitrogen atom, C represents a carbon atom, H represents a hydrogen atom, CyA is any one of a pyridine ring, a quinoline ring, an isoquinoline ring, an imidazole ring, and a triazole ring, and is linked to iridium via the nitrogen atom of the ring, and CyB is a benzene ring, and is linked to iridium via the carbon atom ring; and CyA and CyB may be linked together to further form a ring structure).

2. The method for producing a cyclometalated iridium complex according to claim 1, comprising using as a raw material an organoiridium compound represented by the following General Formula (2):

[Chemical Formula 2]

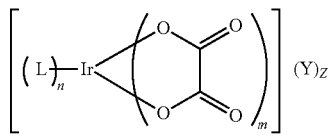

General Formula (2)

(in General Formula (2), Ir represents an iridium atom, and O represents an oxygen atom; L represents a monodentate or bidentate ligand; Y represents a counter cation; Z represents 0 to 3; m represents 1 to 3; and n represents 0 to 4).

3. The method for producing a cyclometalated iridium complex according to claim 1, comprising using as a raw material an organoiridium compound represented by the following General Formula (3):

[Chemical Formula 3]

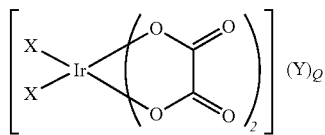

General Formula (3)

(in General Formula (3), Ir represents an iridium atom, and O represents an oxygen atom; X represents a monodentate ligand; Y represents a counter cation; Q represents 2 or 3).

4. The method for producing a cyclometalated iridium complex according to claim 1, comprising using as a raw material an organoiridium compound represented by the following General Formula (4):

[Chemical Formula 4]

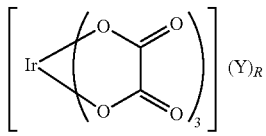

General Formula (4)

(in General Formula (4), Ir represents an iridium atom, and O represents an oxygen atom; Y represents a counter cation; R represents 2 or 3).

* * * * *